US012367656B2

(12) United States Patent
Shreve et al.

(10) Patent No.: US 12,367,656 B2
(45) Date of Patent: Jul. 22, 2025

(54) METHOD AND SYSTEM FOR SEMI-SUPERVISED STATE TRANSITION DETECTION FOR OBJECT TRACKING

(71) Applicant: Palo Alto Research Center Incorporated, Palo Alto, CA (US)

(72) Inventors: Matthew A. Shreve, Campbell, CA (US); Robert R. Price, Palo Alto, CA (US); Jeyasri Subramanian, Sunnyvale, CA (US); Sumeet Menon, Baltimore, MD (US)

(73) Assignee: Xerox Corporation, Norwalk, CT (US)

( * ) Notice: Subject to any disclaimer, the term of this patent is extended or adjusted under 35 U.S.C. 154(b) by 418 days.

(21) Appl. No.: 17/940,884

(22) Filed: Sep. 8, 2022

(65) Prior Publication Data

US 2024/0087287 A1  Mar. 14, 2024

(51) Int. Cl.
*G06V 10/764* (2022.01)
*G06V 10/26* (2022.01)
*G06V 10/774* (2022.01)
*G06V 10/776* (2022.01)
*G06V 10/82* (2022.01)
*G06V 20/40* (2022.01)

(52) U.S. Cl.
CPC ............ *G06V 10/764* (2022.01); *G06V 10/26* (2022.01); *G06V 10/7753* (2022.01); *G06V 10/776* (2022.01); *G06V 10/82* (2022.01); *G06V 20/41* (2022.01)

(58) Field of Classification Search
None
See application file for complete search history.

(56) References Cited

U.S. PATENT DOCUMENTS

| | | | |
|---|---|---|---|
| 10,147,023 B1 | 12/2018 | Klaudiny |
| 10,229,539 B2 | 3/2019 | Shikoda |
| 10,304,159 B2 | 5/2019 | Aoyagi |
| 10,366,521 B1 | 7/2019 | Peacock |
| 11,256,958 B1 | 2/2022 | Subbiah |
| 2008/0189083 A1 | 8/2008 | Schell |

(Continued)

OTHER PUBLICATIONS

Kevin Lai et al., "A Large-Scale Hierarchical Multi-View RGB-D Object Dataset", Robotics and Automation (ICRA), 2011 IEEE International Conferene on, IEEE, May 9, 2011, pp. 1817-1824. *abstract* *Section IV* *Figure 6*.

(Continued)

*Primary Examiner* — Leon Viet Q Nguyen (57) ABSTRACT

A system determines an input video and a first annotated image from the input video which identifies an object of interest. The system initiates a tracker based on the first annotated image and the input video. The tracker generates, based on the first annotated image and the input video, information including: a sliding window for false positives; a first set of unlabeled images from the input video; and at least two images with corresponding labeled states. A semi-supervised classifier classifies, based on the information, the first set of unlabeled images from the input video. If a first unlabeled image is classified as a false positive, the system reinitiates the tracker based on a second annotated image occurring in a frame prior to a frame with the false positive. The system generates an output video comprising the input video displayed with tracking on the object of interest.

20 Claims, 9 Drawing Sheets

(56) References Cited

U.S. PATENT DOCUMENTS

| | | | |
|---|---|---|---|
| 2010/0040272 A1 | 2/2010 | Zheng | |
| 2012/0200601 A1 | 8/2012 | Osterhout | |
| 2013/0127980 A1 | 5/2013 | Haddick | |
| 2015/0037775 A1 | 2/2015 | Ottensmeyer | |
| 2016/0260261 A1 | 9/2016 | Hsu | |
| 2016/0292925 A1 | 10/2016 | Montgomerie | |
| 2016/0328887 A1 | 11/2016 | Elvezio | |
| 2016/0335578 A1 | 11/2016 | Sagawa | |
| 2016/0349511 A1 | 12/2016 | Meiron | |
| 2017/0366805 A1 | 12/2017 | Sevostianov | |
| 2018/0035606 A1 | 2/2018 | Burdoucci | |
| 2018/0204160 A1 | 7/2018 | Chehade | |
| 2018/0315329 A1 | 11/2018 | D'Amato | |
| 2018/0336732 A1 | 11/2018 | Schuster | |
| 2018/0373953 A1* | 12/2018 | Tomotaki | G06V 20/42 |
| 2019/0156202 A1 | 5/2019 | Falk | |
| 2019/0362556 A1 | 11/2019 | Ben-Dor | |
| 2020/0081249 A1 | 3/2020 | Brusnitsyn | |
| 2020/0210780 A1 | 7/2020 | Torres | |
| 2021/0243362 A1 | 8/2021 | Castillo | |
| 2021/0350588 A1 | 11/2021 | Tanida | |
| 2023/0076241 A1* | 3/2023 | Kulandai Samy ... | G06V 10/774 |
| 2023/0138254 A1* | 5/2023 | Panda | G06N 3/0895 382/159 |
| 2023/0215184 A1* | 7/2023 | Fay | G06V 20/58 |

OTHER PUBLICATIONS

Georgios Georgakis et al., "Multiview RGB-D Dataset for Object Instance Detection", 2016 Fourth International Conference on 3D Vision (3DV), Sep. 26, 2016, pp. 426-434. *Abstract* *Section 3*.

Aldoma Aitor et al., "Automation of "Ground Truth" Annotation for Multi-View RGB-D Object Instance Recognition Datasets", 2014 IEEE/RSJ International Conference on Intelligent Robots and Systems, IEEE, Sep. 14, 2014, pp. 5016-5023. * abstract* *Section III*.

Pat Marion et al., "LabelFusion: A Pipeline for Generating Ground Truth Labels for Real RGBD Data of Cluttered Scenes", Jul. 15, 2017, retrieved form the Internet: URL: https://arxiv.org/pdf/1707.04796.pdf. *abstract* *Section 111*.

Alhaija et al., "Augmented Reality Meets Computer Vision: Efficient Data Generation for Urban Driving Scenes", Aug. 4, 2017.

Kaiming He, Georgia Gkioxari, Piotr Dollar Ross Girshick, "Mask R-CNN", arXiv:1703.06870v1 [cs.CV] Mar. 20, 2017.

Umar Iqbal, Anton Milan, and Juergen Gall, "PoseTrack: Joint Multi-Person Pose Estimation and Tracking", arXiv:1611.07727v3 [ cs.CV] Apr. 7, 2017.

Ohan Oda, etal.; "Virtual replicas for remote assistance in virtual and augmented reality", Proceedings of the 28th Annual ACM Symposium on User Interface Software & Technology, Nov. 8-11, 2015, Charlotte, NC, pp. 405-415 (Year: 2015).

Mueller, How To Get Phone Notifications When Your Brother HL-3170CDW Printer Runs Out Of Paper, https://web.archive.org/web/20180201064332/http://www.shareyourrepair.com/2014/12/how-to-get-push-notifications-from-brother-printers-with-gmail-boxcar.html (Year: 2018).

Epson Printer Says Out of Paper but It Isn't, https://smartprintsupplies.com/blogs/news/ p-strong-epson-printer-says-out-of-paper-but-it-isnt-strong-p-p-p (Year: 2018).

Adepu et al. Control Behavior Integrity for Distributed Cyber-Physical Systems (Year: 2018).

Khurram Soomro "UCF101: A Dataset of 101 Human Actions Classes From Videos in The Wild" Dec. 2012.

J. L. Pech-Pacheco et al "Diatom autofocusing in brightheld microscopy: a comparative study" IEEE 2000.

Said Pertuz et al "Analysis of focus measure operators in shape-from-focus", Research gate Nov. 2012, Article Received Jun. 3, 2011, Received in Revised form Oct. 15, 2012, Accepted Nov. 7, 2012, Available priline Nov. 16, 2012.

* cited by examiner

METHOD AND SYSTEM FOR SEMI-SUPERVISED STATE TRANSITION DETECTION FOR OBJECT TRACKING

BACKGROUND

Field

This disclosure is generally related to computer vision systems. More specifically, this disclosure is related to a method and system for semi-supervised state transition detection for object tracking.

Related Art

Current object detection trackers are designed to track an object based on its appearance, e.g., in multiple frames of a video. However, current trackers may fail to maintain track of an object which has undergone a significant shift in appearance caused by a change in its state (i.e., a "state transition"). For example, a tracker which is initialized on a video frame of a laptop in the "closed" state may fail to identify the same laptop after it has been changed to an "opened" state in a subsequent video frame. In such a case, current trackers may latch onto nearby areas, objects, or parts of objects, which can result in an overall failure of the tracker. Furthermore, some solutions may require voluminous amounts of labeled data in order to properly train the tracker. Thus, the challenge remains to automatically and efficiently detect state transitions.

SUMMARY

One embodiment provides a system which facilitates semi-supervised state transition detection for object tracking. During operation, the system determines an input video and a first annotated image from the input video, wherein the first annotated image identifies an object of interest in the input video. The system initiates a tracker based on the first annotated image and the input video beginning from a start of the input video. The system generates, by the tracker based on the first annotated image and the input video, information including: a sliding window for false positives; a first set of unlabeled images from the input video; and at least two images with corresponding labeled states. The system classifies, by a semi-supervised classifier based on the information, the first set of unlabeled images from the input video. Responsive to determining that a first unlabeled image is classified as a false positive, the system reinitiates the tracker based on a second annotated image and the input video beginning from a frame with the second annotated image, wherein the frame with the second annotated image occurs in the input video prior to a frame with the first unlabeled image classified as a false positive. The system generates an output video comprising the input video displayed with tracking on the object of interest, wherein each image from the input video is annotated and labeled with its corresponding state.

In some embodiments, the first and second annotated images comprise at least one of: a bounding box or area defined by a user; and a bounding box or area automatically generated by a computer.

In some embodiments, the at least two images with the corresponding labeled states are labeled based on at least one of: a state defined by a user; a state determined by the user upon a query or other prompt from a computer; and a state determined or detected by the computer.

In some embodiments, the object of interest in the input video comprises a region of interest in the input video.

In some embodiments, the sliding window for false positives comprises background images corresponding to a background state, and the semi-supervised classifier classifies the first set of unlabeled images into at least one of: the background state; and a corresponding labeled state for the at least two images.

In some embodiments, the semi-supervised classifier comprises at least one of: a FixMatch algorithm; a SimCLR framework; and a ReMixMatch algorithm.

In some embodiments, the system classifies the first set of unlabeled images from the input video by applying an overall loss function which is based on a supervised loss function and an unsupervised loss function. The supervised loss function is applied to the at least two images with corresponding labeled states, and the unsupervised loss function is applied to the first set of unlabeled images.

In some embodiments, for a respective unlabeled image of the first set of unlabeled images from the input video, the system generates a weakly augmented image of the respective unlabeled image. The system generates a strongly augmented image of the respective unlabeled image. The system generates, by a convolutional neural network (CNN), a first prediction of a state for the weakly augmented image. Responsive to determining that the first prediction is greater than a predetermined threshold, the system generates, based on the first prediction, a pseudo-label for the respective unlabeled image. The system generates, by the CNN, a second prediction of a state for the strongly augmented image. The system applies the unsupervised loss function to the respective unlabeled image, wherein the unsupervised loss function minimizes a loss between the first prediction and the second prediction.

In some embodiments, the system determines a third annotated image from the input video, wherein the third annotated image identifies the object of interest at an end of the input video. The system initiates the tracker based on the third annotated image and the input video in reverse beginning from the end of the input video. The system generates, by the tracker based on the third annotated image and the input video in reverse, a second set of unlabeled images from the input video, wherein the first set of unlabeled images includes the second set of unlabeled images.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described here provide a system which automatically detects state transitions in a tracked object and also uses the detected state transitions to reinitialize an object tracker upon each state transition, which can improve the overall performance and efficiency of the object tracker.

Current object detection trackers are designed to track an object based on its appearance, e.g., in multiple frames of a video. Some such trackers may be able to localize and track objects found in video frames. However, current trackers may fail to maintain track of an object which has undergone a significant shift in appearance caused by a change in its state (i.e., a "state transition"). For example, a tracker which is initialized on a video frame of a laptop in the "closed" state may fail to identify the same laptop after it has been changed to an "opened" state in a subsequent video frame. As another example, in a cooking video, a tracker may fail when an egg is cracked, thus changing it from an "uncracked" or "whole" state to a "cracked" state. In such cases, current trackers may latch onto nearby areas, objects, or parts of objects, which can result in an overall failure of the tracker. Furthermore, some solutions may require voluminous amounts of labeled data in order to properly train the tracker. Thus, the challenge remains to automatically and efficiently detect state transitions.

The instant embodiments address this challenge by providing a system which automatically detects state transitions in a tracked object and also uses the detected state transitions to reinitialize an object tracker upon each state transition. Given an input video, the system can determine a first annotated image from the input video, where the first annotated image identifies an object of interest in the input video. The user or a computer can generate the first annotated image. The system can initiate a tracker based on the first annotated image and the input video beginning from a start of the input video. The tracker can generate, based on the first annotated image and the input video, information including: a sliding window for false positives; a first set of unlabeled images from the input video; and at least two images with corresponding labeled states. A semi-supervised classifier (such a FixMatch) can classify, based on the information, the first set of unlabeled images from the input video. If an unlabeled image is classified as a false positive, the system can reinitiate the tracker based on a second annotated image and the input video beginning from a frame with the second annotated image, where the frame with the second annotated image occurs in the input video prior to a frame with the first unlabeled image classified as a false positive. That is, the second annotated image can be one of the unlabeled images which are labeled or classified by the semi-supervised classifier. The system can generate an output video comprising the input video displayed with tracking on the object of interest, where each image from the input video is annotated and labeled with its corresponding state. An exemplary environment and framework are described below in relation to, respectively, FIGS. 1 and 2.

In some embodiments, the system can initiate the tracker from the end of the video, i.e., in reverse beginning from the end of the input video, and the user or the system can annotate a third image at the end of the input video. The system can initiate the tracker based on the third annotated image and the input video in reverse beginning from the end of the input video, and the tracker can generate, based on the third annotated image and the input video in reverse, a second set of unlabeled images from the input video, where the first set of unlabeled images includes the second set of unlabeled images. That is, the semi-supervised classifier can classify the first set of unlabeled images (which includes the second set of unlabeled images), as described above. Running the tracker in reverse in this manner may result in additional images which can be used to run through the tracker and may also result in an improved performance or accuracy of the tracker. The described embodiments can use the tracker with the input video in any of the following configurations: running from beginning to end only ("forwards"); running in reverse from the end to the beginning only ("backwards"); and running both forwards and backwards.

Thus, the described embodiments can provide a more efficient tracker and overall tracking system which requires only one annotated image (either user-annotated or system-annotated) and an input video as input to the tracker, in contrast to the typically voluminous amounts of labeled data required. The described tracker can subsequently generate information including: false positives; unlabeled images or unlabeled proposals; and two or more images with corresponding labeled states. The two or more images with corresponding labeled states can be user-labeled or system-labeled. The tracker can feed the generated information (including, in some case, the user-labeled images with corresponding labeled states) into a semi-supervised classifier, which can predict or classify each unlabeled image.

The described embodiments can provide an improvement to current trackers by having the described tracking system collaborate with the semi-supervised classifier. For example, for any false positives generated by the semi-supervised classifier, the described embodiments can reinitiate the tracker from a previous frame of a frame with the false positive, where the previous frame can include a system-annotated image. The described system can thus provide improvements in both automatically detecting state changes and using the automatically detected changes to improve the performance of the overall tracking system, including that of the underlying tracker. These improvements can result in a more efficient overall tracking system and can further eliminate the need for voluminous amounts of labeled data (e.g., by using only a single user- or system-annotated image and by using two or more images with corresponding user- or system-labeled states).

The term "object of interest" or "region of interest" can refer to an object, region, or area depicted or displayed in an image, e.g., in an electronic or digital image, or in a frame of a video. The object of interest may correspond to a physical or material item of interest and can include, e.g., parts, devices, equipment, tools, people, animals, body parts, etc. Similarly, the region of interest may correspond to an object or an area/space associated with an object or a physical space depicted or displayed in an image.

The term "computing device" can refer to a device or entity which is capable of being connected to a network. In this disclosure, a computing device may include tools which allow a user to mark annotations around, on, for, or associated with an object of interest or a region of interest in an image.

The term "computing system" can refer to a computing device which is coupled to peripheral input/output (I/O) devices, such as a keyboard, a video monitor or display screen, and a pointing device or mouse.

The terms "state change" and "state transition" are used interchangeably in this disclosure and refer to a change or transition of the appearance of an object from one state to another, e.g., of a printer tray from an "open" state to a "closed" state.

Figure 1:
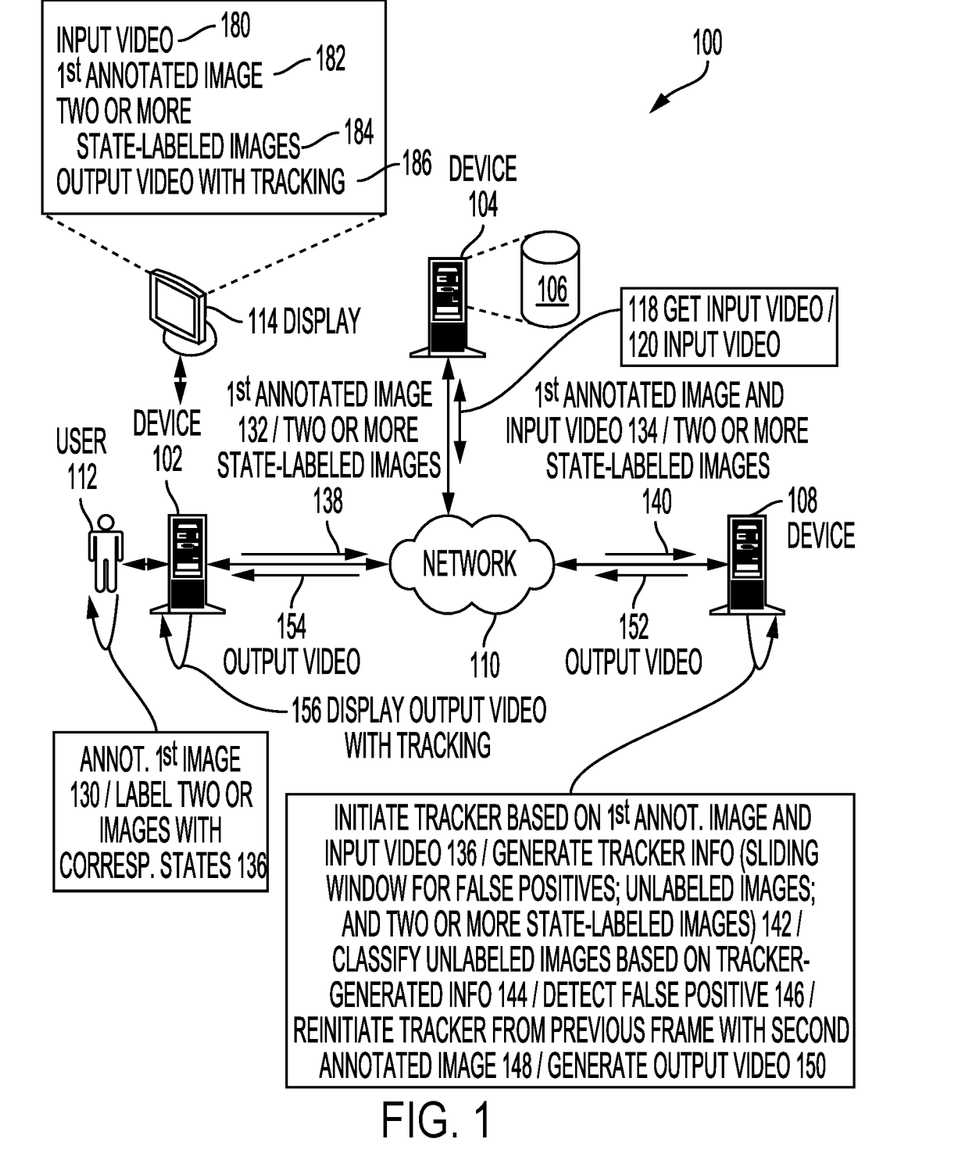
FIG. 1 illustrates an exemplary environment for facilitating semi-supervised state transition detection for object tracking, in accordance with an embodiment of the present invention.

Exemplary Environment and Framework for Facilitating Semi-Supervised State Transition Detection for Object Tracking FIG. 1 illustrates an exemplary environment 100 for facilitating semi-supervised state transition detection for object tracking, in accordance with an embodiment of the present invention. Environment 100 can include: a device 102 associated with a user 112 and a display 114; a device 104 with an associated storage 106; and a device 108. Devices 102, 104, and 108 can communicate with each other over a network 110. Devices 102, 104, and 108 can include any computing device, system, entity, or server which can transmit, receive, and store data and can also perform the operations described herein. Devices 102, 104, and 108 may be associated with peripheral input/output (I/O) devices (e.g., display 114 associated with device 102).

Device 104 can store data (e.g., in a database 106). The stored data can include an input video which can contain an object or region of interest to be tracked by a tracker. During operation, device 104 can receive a request to get input video 118 and can return an input video 120 (or automatically transmit input video 120 based on a predetermined condition or time interval). Input video 120 can be transmitted to both of device 102 and device 108. Device 102 can receive and store input video 120 (not shown), which can be displayed as an input video 180 on display 114 for user 112. User 112 can annotate a first image (operation 130) of input video 180, e.g., by using peripheral input/output (I/O) devices (not shown) to place a bounding box or other shape/area around the object or region of interest. This first annotated image may occur in a frame at or "near" (e.g., within a predetermined number of frame or a predetermined number of seconds from) the beginning of input video 180 and can be displayed as a first annotated image 182 on display 114. User 112 can send, via device 102, a first annotated image 132 to device 108, which can receive both the first annotated image 132 and input video 120, displayed as 180 (as a first annotated image and input video 134).

Upon receiving first annotated image and input video 134, device 108 can initiate a tracker based on the first annotated image and input video (operation 136). Device 108 (or a tracker module or component installed or residing on device 108) can generate tracker information, including: a sliding window for false positive; unlabeled images; and two or more state-labeled images (operation 142). While FIG. 1 depicts device 108 as generating the two or more state-labeled images, in some embodiments, user 112 can provide the state-labeled images, e.g., user 112 can place state labels on two or more images of the input video by using peripheral I/O device (not shown) to label two or more images with corresponding states (operation 136). These two or more images may occur anywhere within input video 180 and can be displayed as two or more state-labeled images 184 on display 114. User 112 can send, via device 102, two or more state-labeled images 138 to device 108, which can receive the two or more state-labeled images 138 (as two or more state-labeled images 140).

Device 108 can classify unlabeled images based on the tracker-generated information (i.e., the false positive, the unlabeled images, and the two or more state-labeled images) (operation 144). Device 108, in response to detecting a false positive (operation 146), can reinitiate the tracker from a previous frame with a second annotated image (operation 148). The second annotated image may appear in a frame prior to a frame which includes the detected false positive, and the second annotated image may be an image which has been labeled by the tracker during the classifying step (i.e., as part of operation 144).

Device 108 can iterate through operations 142, 144, 146, and 148 until a certain condition is reached. The condition can be based on, e.g.: a determination that no more false positives exist and that the tracker need not be reinitiated; and a determination that the number of remaining false positives is below a certain predetermined number. Once device 108 has determined that iteration is no longer necessary, device 108 can generate the output video (operation 150) and transmit an output video 152 back to device 102. Device 102 can receive output video 152 (as an output video 154) and can display an output video with tracking 186 on display 114.

In some embodiments, the output video generated (as a result of operation 150) by device 108 may include the entire input video with the addition of the tracking displayed on the object of interest throughout the video, where each frame with an image of the object of interest is annotated is labeled with the corresponding state for the object of interest. In other embodiments, the output video generated (as a result of operation 150) may include only information relating to the annotated and state-labeled image for each frame (not shown). In such a situation, device 102 may receive the generated information (not shown) and display output video with tracking 186 by incorporating the generated information with the previously stored or viewed input video 180.

Figure 2:
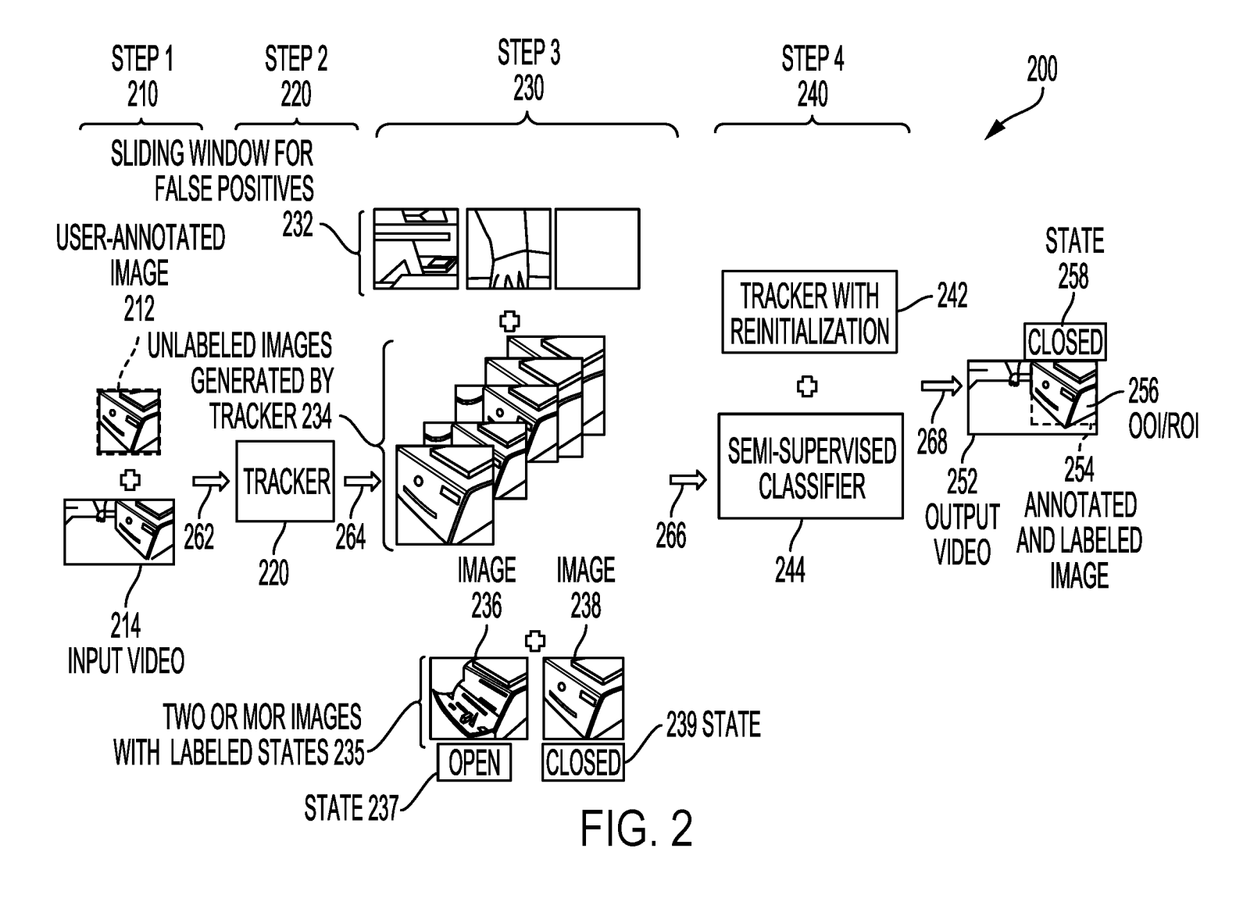
FIG. 2 presents a diagram illustrating a framework for facilitating semi-supervised state transition detection for object tracking, in accordance with an embodiment of the present invention.

FIG. 2 presents a diagram 200 illustrating a framework for facilitating semi-supervised state transition detection for object tracking, in accordance with an embodiment of the present invention. Diagram 200 illustrates a series of four steps: a step 1 210; a step 2 220; a step 3 230; and a step 4 240. In step 1 210, the system can determine or obtain a user-annotated image 212 and an input video 214. User-annotated image 212 can include a bounding box around an object of interest or a region of interest (as indicated by a thick dashed-line box around the object or region of interest). While image 212 is depicted as a user-annotated image with a bounding box, image 212 can be also be annotated by a system can further indicate a bounding shape or area other than a box.

In step 2 220, a tracker 220 can receive (via a communication 262) and process user-annotated image 212 and input video 214. User-annotated image 212 can be an image from a frame at or near the start of the input video, in which case tracker 220 can run the input video beginning from the start of the input video ("forwards"). User-annotated image 212 can also be an image from a frame at or near the end of the input video, in which case tracker 220 can run the input video beginning from the end of the input video ("backwards"). In some embodiments, tracker 220 can run the input video both forwards and backwards, i.e., use one user-annotated image from the start of the video and play the input video forward, and also use one user-annotated image from the end of the input video and play the input video in reverse (backwards).

In step 3 230, tracker 220 can generate (via a communication 264) certain information, including: a sliding window for false positives 232; unlabeled images generated by tracker 234; and two or more images with labeled states 236. Images 236 can include: an image 236 with a corresponding labeled state 237 of "open"; and an image 238 with a corresponding labeled state 239 of "closed."

In step 4 240, a semi-supervised classifier 244 can receive (via a communication 266) the information generated or obtained as part of step 3 230. Semi-supervised classifier 244 can classify the unlabeled images, and upon detecting a false positive, reinitiate the tracker from a previous frame with a second annotated image (depicted as a tracker with reinitialization 242). The classification, detection, and reinitiation steps are similar to operations 144, 146, and 148 described in relation to FIG. 1. In a step 5 (not depicted), the system can iterate through steps 1, 2, 3, and 4 (210, 220, 230, and 240, respectively) until no more false positives are generated by tracker 220 in step 2 or until some other condition is reached (as described above in relation to FIG. 1).

The system can generate an output video 252 (via a communication 268), which can include, for each frame in which the object of interest (OOI) or the region of interest (ROI) appears, an annotated and labeled image. For example, in the frame displayed in output video 252, an OOI/ROI 256 (e.g., a printer) is indicated as annotated with a bounding box (shown with a thick dashed-line border) and marked as an annotated and labeled image 254. In addition, the frame can also include the state-labeled information of "Closed" for OOI/ROI 256 in annotated and labeled image 254. When output video 252 is played, OOI/ROI 256 may appear in most or all consecutive frames with the correct state label, including changes to the state labels upon state transitions.

Framework for Performing Semi-Supervised Tracking of Unlabeled Images

The semi-supervised classifier used in step 4 240 of FIG. 2 can be based on, e.g.: a FixMatch algorithm; a SimCLR framework; and a ReMixMatch algorithm. Classifying the unlabeled images generated by the tracker can be performed by applying an overall loss function which is based on both a supervised loss function and an unsupervised loss function $L_{unsup}$:

$$L = L_{sup} + \lambda L_{unsup} \quad (1).$$

The supervised loss function can be applied to the labeled images (e.g., 235, including 236 and 238 of FIG. 2) and can be expressed as:

$$L_{sup} = H(y, y') \quad (2),$$

where y is the real label and y' is the label predicted by the model.

Figure 3:
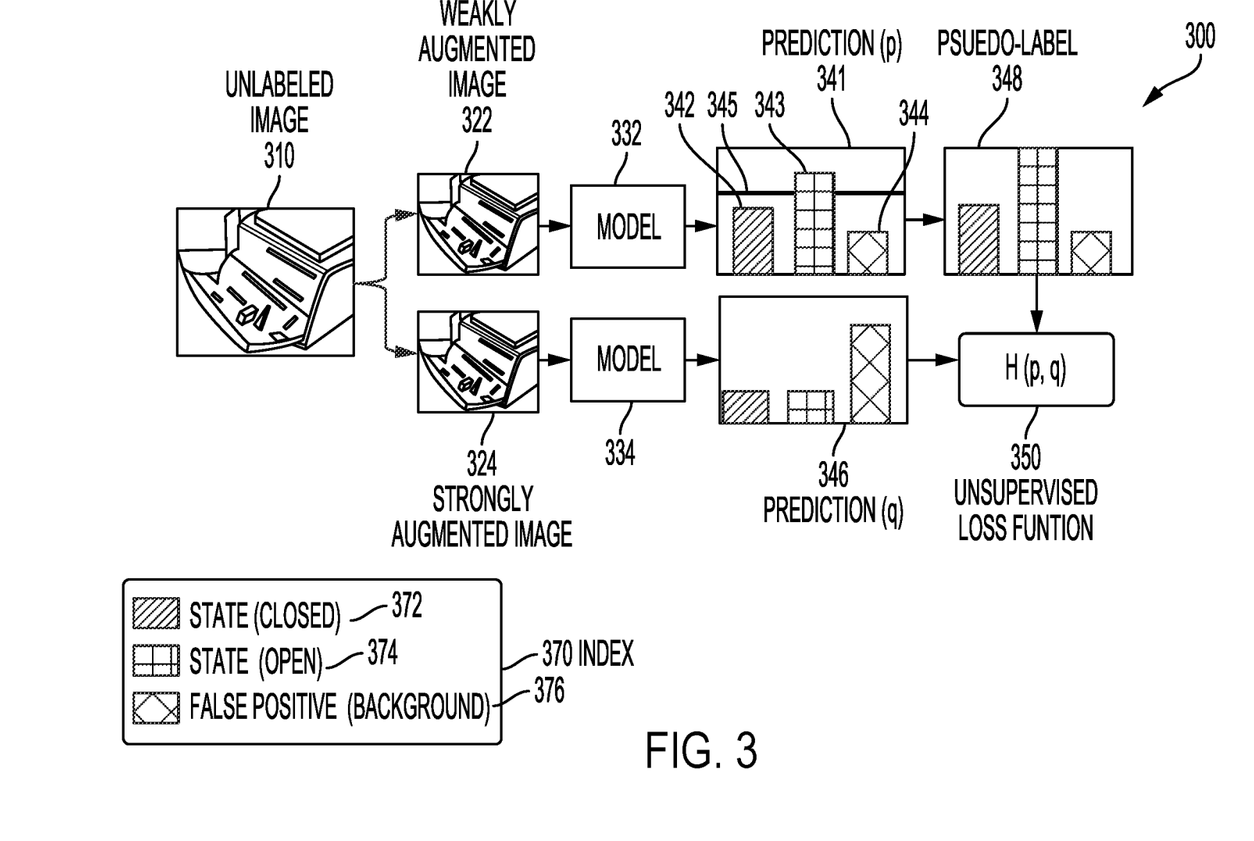
FIG. 3 presents a diagram illustrating a framework for performing semi-supervised tracking of unlabeled images, in accordance with an embodiment of the present application.

The unsupervised loss function can be applied to the unlabeled images (e.g., 234 of FIG. 2) and can be expressed as:

$$L_{unsup} = H(p, q) \quad (3),$$

where p is a first prediction from a first branch of a semi-supervised classifier based on a weakly augmented image and a pseudo-label, and where q is a second prediction from a second branch of the semi-supervised classifier based on a strongly augmented image, as shown below in relation to FIG. 3.

FIG. 3 presents a diagram 300 illustrating a framework for performing semi-supervised tracking of unlabeled images, in accordance with an embodiment of the present application. An unlabeled image 310 can be one of the plurality of unlabeled images generated by a tracker, e.g., one of the unlabeled images 234 as generated by tracker 220 in FIG. 2 or one of the unlabeled images generated by the tracker as part of operation 142 in FIG. 1. An index 370 indicates that certain fill patterns can correspond to a class to which model 332 predicts for a given image, including a labeled state or a false positive. For example: right-slanting diagonal lines in the fill pattern can correspond to a state 372 (such as "Closed"); a cross-hatch fill pattern can correspond to a state 374 (such as "Open"); and a diagonal cross-hatch fill pattern can correspond to a false positive 376 (such as "Background").

Diagram 300 depicts two branches of processing for an unlabeled image 310, e.g., for processing by a semi-supervised classifier such as FixMatch. In a first branch, a weakly augmented image 322 can be fed into a convolutional neural network (CNN) model 332, which can generate a prediction (p) 341. Prediction 341 can indicate a probability distribution regarding how model 332 classifies weakly augmented image 322. Each bar in prediction 341 can correspond to a class, where the fill patterns correspond to the classes or states as described above for index 370 (e.g., bars 342, 343, and 344 can indicate classes or states 372, 374, and 376, respectively). Furthermore, a line 345 can indicate a predetermined threshold over which the system can determine that a certain probability distribution for a class or state can serve as a pseudo-label for the unlabeled image. For example, because bar 343 indicates that the probability distribution or prediction of weakly augmented image 322 (of unlabeled image 310) as state 374 is greater than predetermined threshold 345, the system can generate a pseudo-label 348 corresponding to state 374 for weakly augmented image 322.

In a second branch of diagram 300, a strongly augmented image 324 can be fed into the same CNN model (depicted as a model 334), which can generate a prediction (q) 346. As described above for prediction 341, prediction 346 can indicate a probability distribution regarding how model 334 classifies strongly augmented image 324. The system can use an unsupervised loss function 350, where $L_{unsup} = H(p, q)$, to minimize the loss between the weakly and strong augmented images (322 and 324), i.e., the loss between the predictions of the probability distributions for the weakly and strongly augmented images (322 and 324).

Figure 4A:
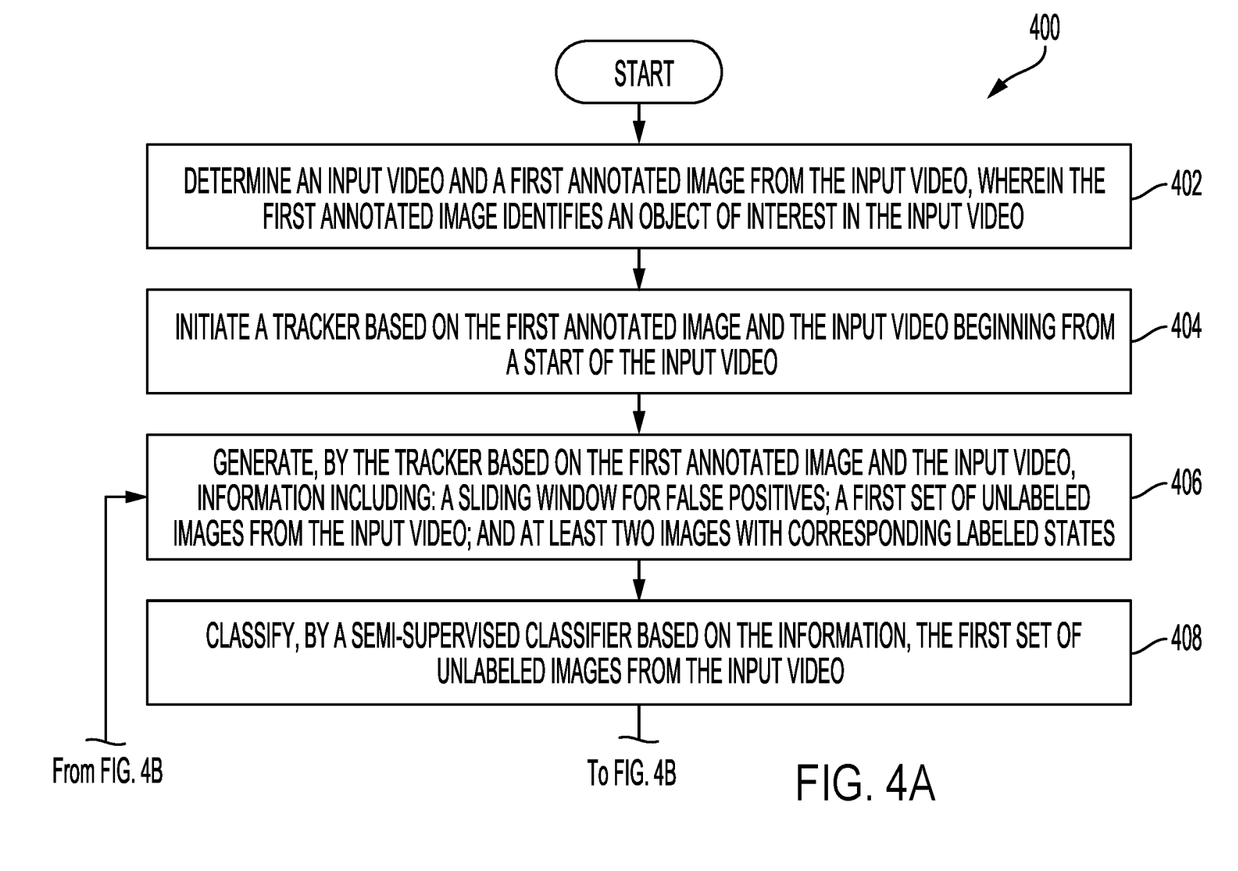
FIGS. 4A and 4B present a flowchart illustrating a method for facilitating semi-supervised state transition detection for object tracking, in accordance with an embodiment of the present invention.
Figure 4B:
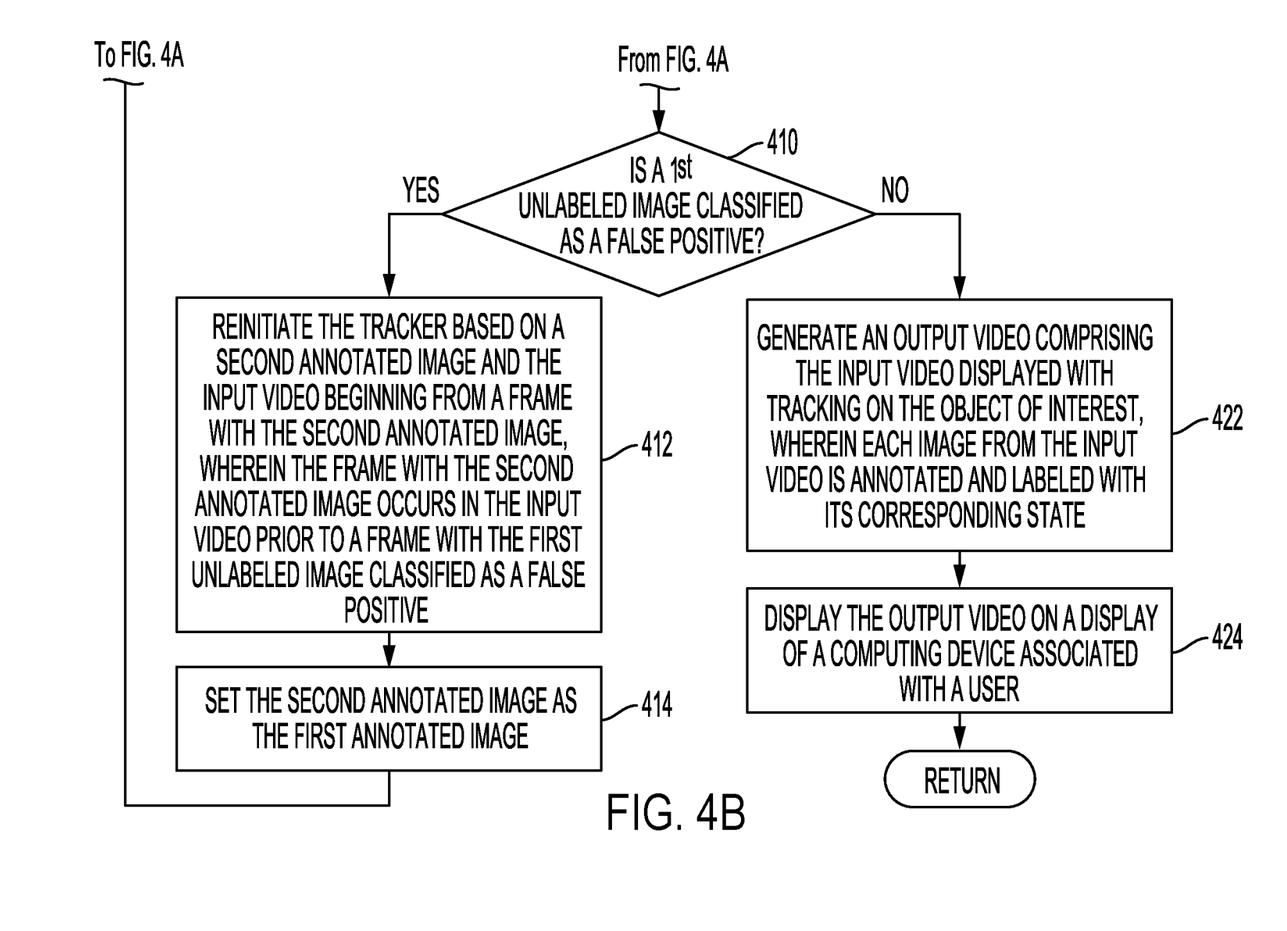

Method for Facilitating Semi-Supervised State Transition Detection for Object Tracking FIGS. 4A and 4B present a flowchart 400 illustrating a method for facilitating semi-supervised state transition detection for object tracking, in accordance with an embodiment of the present invention. During operation, the system determines an input video and a first annotated image from the input video, wherein the first annotated image identifies an object of interest in the input video (operation 402). The system initiates a tracker based on the first annotated image and the input video beginning from a start of the input video (operation 404). The system generates, by the tracker based on the first annotated image and the input video, information including: a sliding window for false positives; a first set of unlabeled images from the input video; and at least two images with corresponding labeled states (operation 406). The system classifies, by a semi-supervised classifier based on the information, the first set of unlabeled images from the input video (operation 408).

If a first unlabeled image is classified as a false positive (decision 410), the system reinitiates the tracker based on a second annotated image and the input video beginning from a frame with the second annotated image, wherein the frame with the second annotated image occurs in the input video prior to a frame with the first unlabeled image classified as a false positive (operation 412). The system sets the second annotated image as the first annotated image (operation 414) and returns to operation 406. That is, the system iterates through: the tracker generating the information again based on the first annotated image (which is now set to be the second annotated image) and the input video (which is set to start from the frame which includes the second annotated image); the semi-supervised classifier classifying the unlabeled images from the information which is generated again; determining whether false positive exist in the information which is generated again; and if so, reinitiating the tracker to start from a previous frame. This iteration is described above in relation to both FIGS. 1 and 2.

If the first unlabeled image is not classified as a false positive (or no more false positives exist or the number of false positives is below a predetermined number) (decision 410), the system generates an output video comprising the input video displayed with tracking on the object of interest, wherein each image from the input video is annotated and labeled with its corresponding state (operation 422). The system displays the output video on a display of a computing device associated with a user (operation 424), and the operation returns.

Method for Performing Semi-Supervised Tracking of Unlabeled Images

Figure 5A:
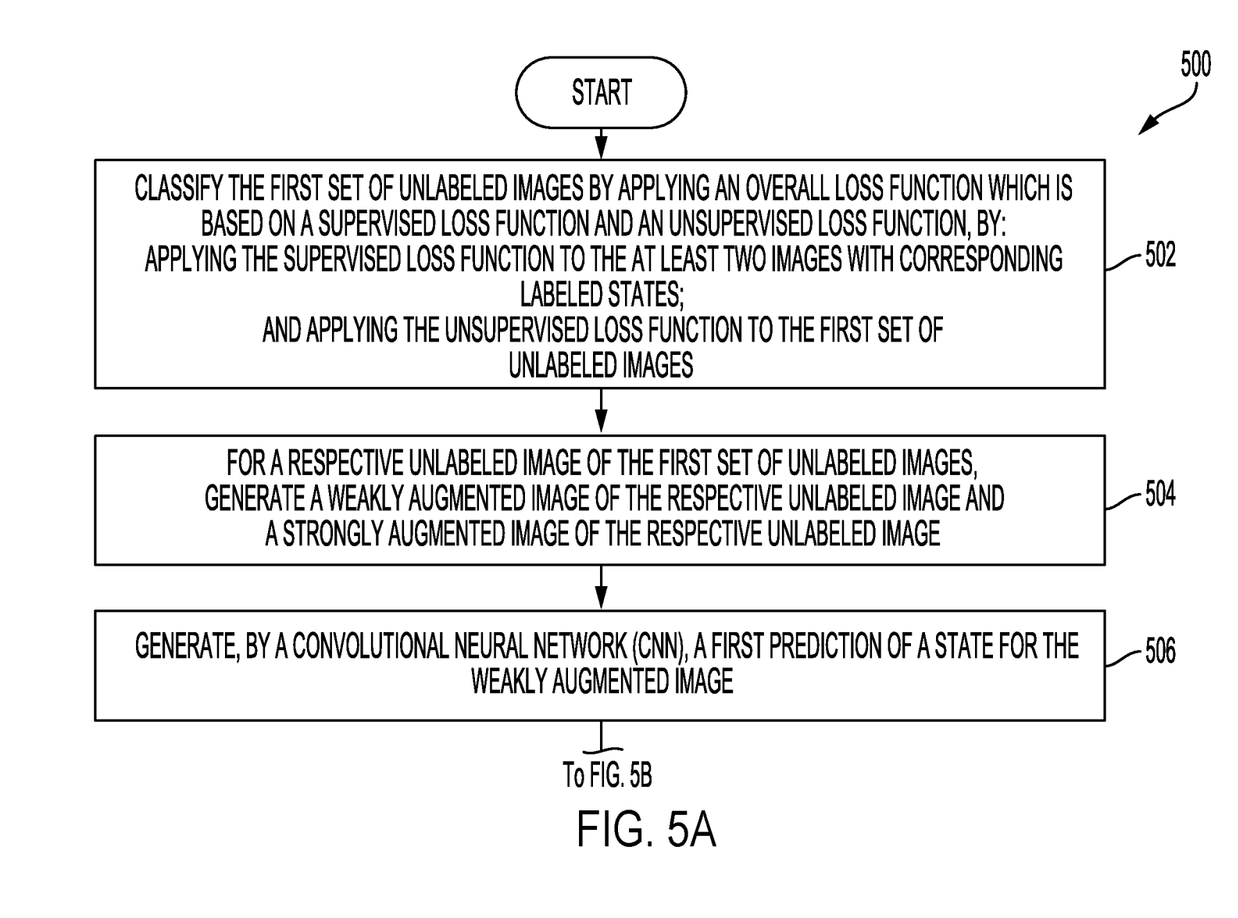
FIGS. 5A and 5B present a flowchart illustrating a method for performing semi-supervised tracking of unlabeled images, in accordance with an embodiment of the present invention.
Figure 5B:
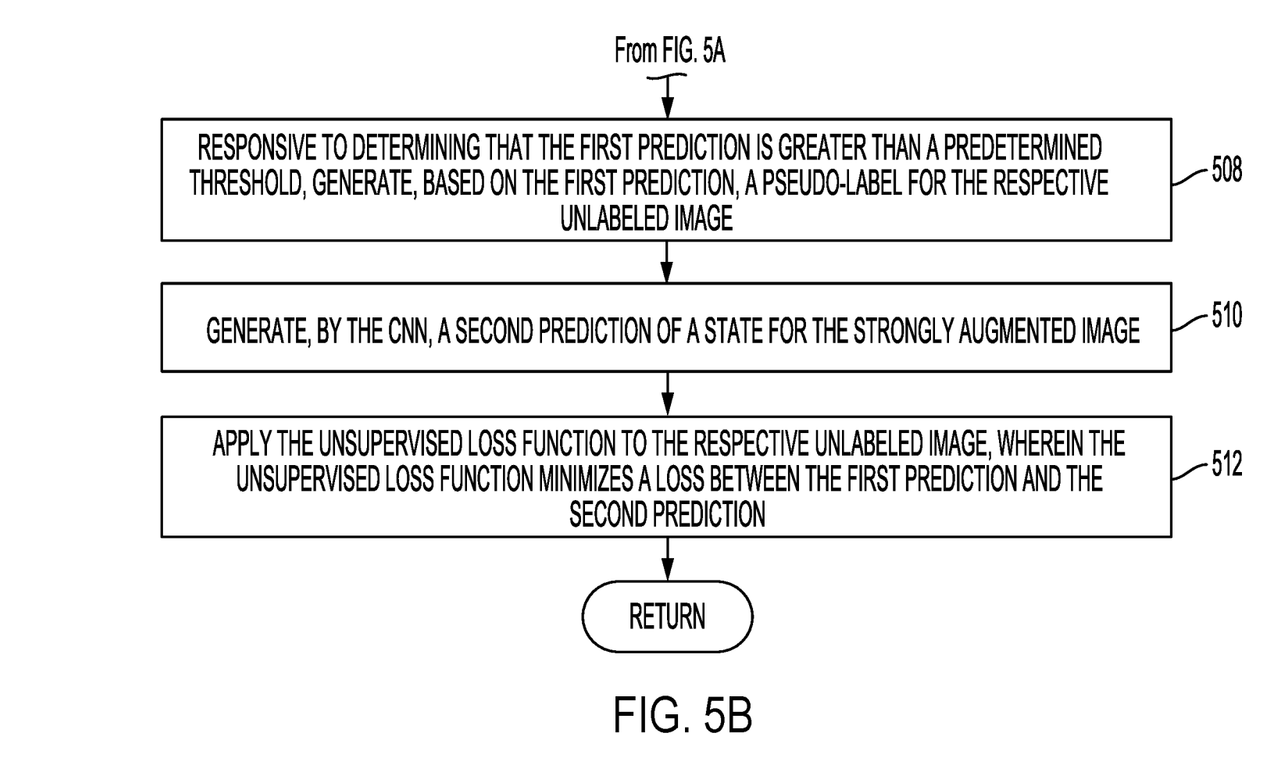

FIGS. 5A and 5B present a flowchart 500 illustrating a method for performing semi-supervised tracking of unlabeled images, in accordance with an embodiment of the present invention. Flowchart 500 can correspond to operation 408 of FIG. 4A (i.e., classifying the set of unlabeled images). During operation, the system classifies the first set of unlabeled images from the input video by applying an overall loss function which is based on a supervised loss function and an unsupervised loss function, by: applying the supervised loss function to the at least two images with corresponding labeled states; and applying the unsupervised loss function to the first set of unlabeled images (operation 502). For a respective unlabeled image of the first set of unlabeled images, the system generates a weakly augmented image of the respective unlabeled image and a strongly augmented image of the respective unlabeled image (operation 504).

The system generates, by a convolutional neural network (CNN), a first prediction of a state for the weakly augmented image (operation 506). Responsive to determining that the first prediction is greater than a predetermined threshold, the system generates, based on the first prediction, a pseudo-label for the respective unlabeled image (operation 508). The system generates, by the CNN, a second prediction of a state for the strongly augmented image (operation 510). The system applies the unsupervised loss function to the respective unlabeled image, wherein the unsupervised loss function minimizes a loss between the first prediction and the second prediction (operation 512). The operation returns.

Thus, the embodiments described herein provide a system which increases the efficiency of detecting state transitions in a tracked object, e.g., by a tracker, tracking component or module, or a tracking system. The described system addresses the challenges faced by current trackers which may fail to maintain track of an object which undergoes a state transition. The described embodiments can automatically detect state transitions and can further use the automatically detected state transitions to reinitialize a tracker upon each state change, which can result in improving the efficiency and performance of the tracker and the overall tracking system.

Moreover, the described embodiments can eliminate the need for voluminous labeled data by using only a single annotated image (e.g., first annotated image 132 of FIG. 1 or user-annotated image 212 of FIG. 2), along with two or more images with labeled states, to perform the automatic detection and the tracker reinitialization.

Exemplary Computer and Apparatus

Figure 6:
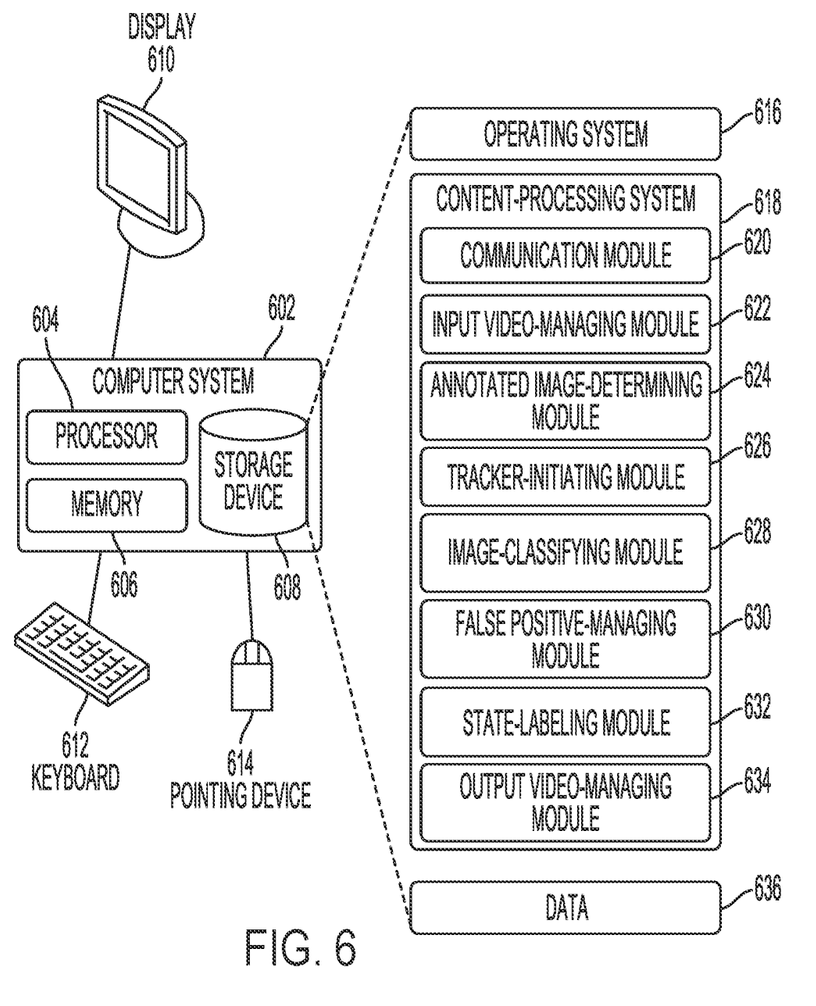
FIG. 6 illustrates an exemplary computer and communication system that facilitates semi-supervised state transition detection for object tracking, in accordance with an embodiment of the present invention.

FIG. 6 illustrates an exemplary computer and communication system 602 that facilitates semi-supervised state transition detection for object tracking, in accordance with an embodiment of the present invention. Computer system 602 can include a processor 604, a memory 606, and a storage device 608. Memory 606 can include a volatile memory (e.g., RAM) that serves as a managed memory and can be used to store one or more memory pools. Furthermore, computer system 602 can be coupled to a display device 610, a keyboard 612, and a pointing device 614. Storage device 608 can store an operating system 616, a content-processing system 618, and data 636.

Content-processing system 618 can include instructions, which when executed by computer system 602, can cause computer system 602 to perform methods and/or processes described in this disclosure. Specifically, content-processing system 618 may include instructions for sending and/or receiving/obtaining data packets to/from other network nodes across a computer network (communication module 620). A data packet can include an image, an annotated image, a state-labeled image, a frame, and a video.

Content-processing system 618 can further include instructions for determining an input video and a first annotated image from the input video, wherein the first annotated image identifies an object of interest in the input video (input video-managing module and annotated image-determining module 624). Content-processing system 618 can include instructions for initiating a tracker based on the first annotated image and the input video beginning from a start of the input video (tracker-initiating module 626). Content-processing system 618 can include instructions for generating, by the tracker based on the first annotated image and the input video, information including: a sliding window for false positives; a first set of unlabeled images from the input video; and at least two images with corresponding labeled states (tracker-initiating module 626 and state-labeling module 632). Content-processing system 618 can also include instructions for classifying, by a semi-supervised classifier based on the information, the first set of unlabeled images from the input video (image-classifying module 628). Content-processing system 618 can include instructions for, responsive to determining that a first unlabeled image is classified as a false positive (false positive-managing module 630), reinitiating the tracker based on a second annotated image and the input video beginning from a frame with the second annotated image, wherein the frame with the second annotated image occurs in the input video prior to a frame with the first unlabeled image classified as a false positive (tracker-initiating module 626). Content-processing system 618 can additionally include instructions for generating an output video comprising the input video displayed with tracking on the object of interest, wherein each image from the input video is annotated and labeled with its corresponding state (output video-managing module 634).

Data 636 can include any data that is required as input or that is generated as output by the methods and/or processes described in this disclosure. Specifically, data 636 can include at least: an input video; an image; an annotated image; a state-labeled image; an indicator of an object of interest or a region of interest; an indication of initiating or reinitiating a tracker; an indicator of a start or an end of a video; a number of frames; a number of seconds; information; a sliding window for false positives; unlabeled images; at least two images with corresponding labeled states; an indicator of one or more states; an indicator of a tracker, tracking component or module, tracking system, semi-supervised classifier, or semi-supervised algorithm or framework; a labeled state; a classification; a false positive; a background image; a frame; a previous frame; an output video; an output video which can be displayed with tracking on an object or region of interest; a bounding box or other shape/area; a loss function; a supervised loss function; an unsupervised loss function; a hyperparameter; a weakly augmented image; a strongly augmented image; a prediction; a probability distribution; a threshold or a predetermined threshold; a number or a predetermined number; an indicator of a model or a CNN; an indicator of an automatic detection of a state change or a state transition; an indicator of a use of an automatically detected state change to improve the overall tracking performance of an underlying tracker.

Figure 7:
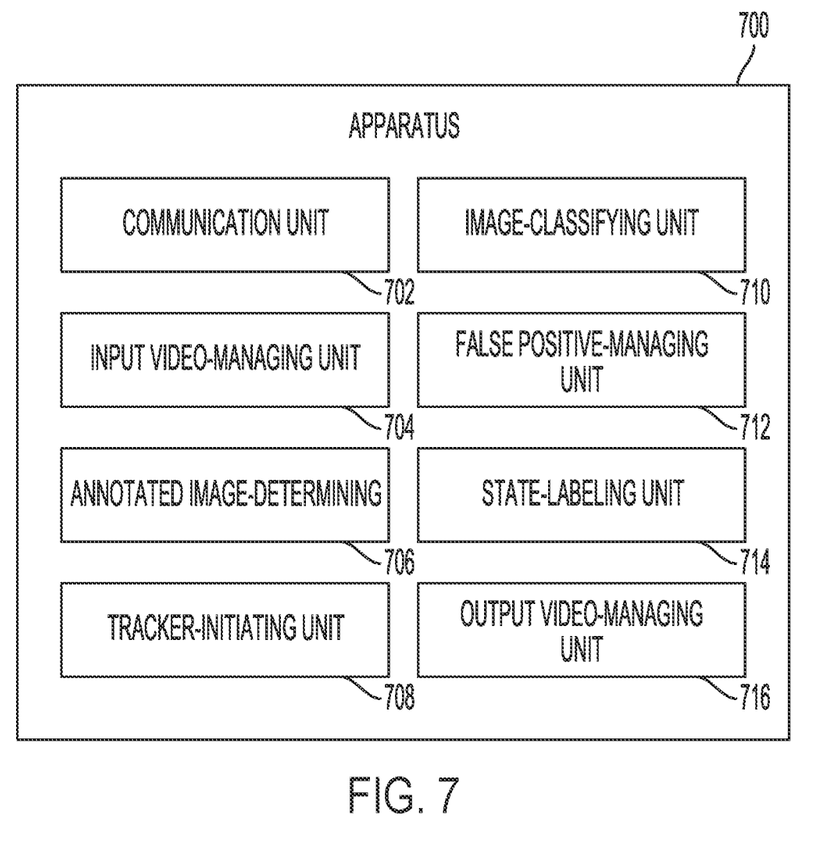
FIG. 7 illustrates an exemplary apparatus that facilitates semi-supervised state transition detection for object tracking, in accordance with an embodiment of the present application.

FIG. 7 illustrates an exemplary apparatus 700 that facilitates semi-supervised state transition detection for object tracking, in accordance with an embodiment of the present application. Apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device or devices capable of communicating with other computer systems and/or devices. Specifically, apparatus 700 can comprise units 702-716 which perform functions or operations similar to modules 620-634 of computer system 602 of FIG. 6, including: a communication unit 702; an input video-managing unit 704; an annotated image-determining unit 706; a tracker-initiating unit 708; an image-classifying unit 710; a false positive-managing unit 712; a state-labeling unit 714; and an output video-managing unit 716.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
receiving an input video and a first annotated image from the input video, wherein the first annotated image identifies an object of interest in the input video;
initiating a tracker based on the first annotated image and the input video beginning from a start of the input video;
generating, by the tracker based on the first annotated image and the input video, information including: a sliding window for false positives; a first set of unlabeled images from the input video; and at least two images in which the object of interest is labeled with its corresponding state;
classifying, by a semi-supervised classifier based on the information, the first set of unlabeled images from the input video;
responsive to determining that a first unlabeled image is classified as a false positive, reinitiating the tracker based on a second annotated image and the input video beginning from a frame with the second annotated image, wherein the frame with the second annotated image occurs in the input video prior to a frame with the first unlabeled image classified as a false positive; and
generating an output video comprising the input video displayed with tracking on the object of interest, wherein the object of interest in each image from the input video is annotated and labeled with its corresponding state.

2. The method of claim 1, wherein the first and second annotated images comprise at least one of:
a bounding box or area defined by a user; and
a bounding box or area automatically generated by a computer.

3. The method of claim 1, wherein the at least two images in which the object of interest is labeled with its corresponding state are labeled based on at least one of:

a state defined by a user;
a state determined by the user upon a query or other prompt from a computer; and
a state determined or detected by the computer.

4. The method of claim 1, wherein the object of interest in the input video comprises a region of interest in the input video.

5. The method of claim 1,
wherein the sliding window for false positives comprises background images corresponding to a background state, and
wherein the semi-supervised classifier classifies the first set of unlabeled images into at least one of: the background state; and a corresponding labeled state for the at least two images.

6. The method of claim 1, wherein the semi-supervised classifier comprises at least one of:
a FixMatch algorithm;
a SimCLR framework; and
a ReMixMatch algorithm.

7. The method of claim 1, wherein classifying the first set of unlabeled images from the input video comprises:
applying an overall loss function which is based on a supervised loss function and an unsupervised loss function,
wherein the supervised loss function is applied to the at least two images with corresponding labeled states, and
wherein the unsupervised loss function is applied to the first set of unlabeled images.

8. The method of claim 7, wherein for a respective unlabeled image of the first set of unlabeled images from the input video, the method further comprises:
generating a weakly augmented image of the respective unlabeled image;
generating a strongly augmented image of the respective unlabeled image;
generating, by a convolutional neural network (CNN), a first prediction of a state for the weakly augmented image;
responsive to determining that the first prediction is greater than a predetermined threshold, generating, based on the first prediction, a pseudo-label for the respective unlabeled image;
generating, by the CNN, a second prediction of a state for the strongly augmented image; and
applying the unsupervised loss function to the respective unlabeled image, wherein the unsupervised loss function minimizes a loss between the first prediction and the second prediction.

9. The method of claim 1, further comprising:
determining a third annotated image from the input video, wherein the third annotated image identifies the object of interest at an end of the input video;
initiating the tracker based on the third annotated image and the input video in reverse beginning from the end of the input video; and
generating, by the tracker based on the third annotated image and the input video in reverse, a second set of unlabeled images from the input video,
wherein the first set of unlabeled images includes the second set of unlabeled images.

10. A computer system, the system comprising:
a processor; and
a storage device storing instructions that when executed by the processor cause the processor to perform a method, the method comprising:
receiving an input video and a first annotated image from the input video, wherein the first annotated image identifies an object of interest in the input video;
initiating a tracker based on the first annotated image and the input video beginning from a start of the input video;
generating, by the tracker based on the first annotated image and the input video, information including: a sliding window for false positives; a first set of unlabeled images from the input video; and at least two images in which the object of interest is labeled with its corresponding state;
classifying, by a semi-supervised classifier based on the information, the first set of unlabeled images from the input video;
responsive to determining that a first unlabeled image is classified as a false positive, reinitiating the tracker based on a second annotated image and the input video beginning from a frame with the second annotated image, wherein the frame with the second annotated image occurs in the input video prior to a frame with the first unlabeled image classified as a false positive; and
generating an output video comprising the input video displayed with tracking on the object of interest, wherein the object of interest in each image from the input video is annotated and labeled with its corresponding state.

11. The computer system of claim 10,
wherein the first and second annotated images comprise at least one of:
a bounding box or area defined by a user; and
a bounding box or area automatically generated by a computer, and
wherein the object of interest in the input video comprises a region of interest in the input video.

12. The computer system of claim 10, wherein the at least two images in which the object of interest is labeled with its corresponding state are labeled based on at least one of:
a state defined by a user;
a state determined by the user upon a query or other prompt from a computer; and
a state determined or detected by the computer.

13. The computer system of claim 10,
wherein the sliding window for false positives comprises background images corresponding to a background state, and
wherein the semi-supervised classifier classifies the first set of unlabeled images into at least one of: the background state; and a corresponding labeled state for the at least two images.

14. The computer system of claim 10, wherein the semi-supervised classifier comprises at least one of:
a FixMatch algorithm;
a SimCLR framework; and
a ReMixMatch algorithm.

15. The computer system of claim 10, wherein classifying the first set of unlabeled images from the input video comprises:
applying an overall loss function which is based on a supervised loss function and an unsupervised loss function,
wherein the supervised loss function is applied to the at least two images with corresponding labeled states, and
wherein the unsupervised loss function is applied to the first set of unlabeled images.

16. The computer system of claim 15, wherein for a respective unlabeled image of the first set of unlabeled images from the input video, the method further comprises:
- generating a weakly augmented image of the respective unlabeled image;
- generating a strongly augmented image of the respective unlabeled image;
- generating, by a convolutional neural network (CNN), a first prediction of a state for the weakly augmented image;
- responsive to determining that the first prediction is greater than a predetermined threshold, generating, based on the first prediction, a pseudo-label for the respective unlabeled image;
- generating, by the CNN, a second prediction of a state for the strongly augmented image; and
- applying the unsupervised loss function to the respective unlabeled image, wherein the unsupervised loss function minimizes a loss between the first prediction and the second prediction.

17. The computer system of claim 10, wherein the method further comprises:
- determining a third annotated image from the input video, wherein the third annotated image identifies the object of interest at an end of the input video;
- initiating the tracker based on the third annotated image and the input video in reverse beginning from the end of the input video; and
- generating, by the tracker based on the third annotated image and the input video in reverse, a second set of unlabeled images from the input video,
    - wherein the first set of unlabeled images includes the second set of unlabeled images.

18. A non-transitory computer readable storage medium storing instructions which, when executed by a computer cause the computer to perform a method, the method comprising:
- receiving an input video;
- determining a first annotated image from the input video, wherein the first annotated image identifies an object of interest in the input video;
- initiating a tracker based on the first annotated image and the input video beginning from a start of the input video;
- generating, based on the first annotated image and the input video, information including: a sliding window for false positives; a first set of unlabeled images from the input video; and at least two images in which the object of interest is labeled with its corresponding state;
- classifying, by a semi-supervised classifier based on the information, the first set of unlabeled images from the input video;
- determining whether a first unlabeled image is classified as a false positive,
- responsive to determining that a first unlabeled image is classified as a false positive, reinitiating the tracker based on a second annotated image and the input video beginning from a frame with the second annotated image, wherein the frame with the second annotated image occurs in the input video prior to a frame with the first unlabeled image classified as a false positive; and
- generating an output video comprising the input video displayed with tracking on the object of interest, wherein the object of interest in each image from the input video is annotated and labeled with its corresponding state.

19. The non-transitory computer readable storage medium of claim 18,
- wherein the first and second annotated images comprise at least one of:
    - a bounding box or area defined by a user; and
    - a bounding box or area automatically generated by a computer; and
- wherein the at least two images with the corresponding labeled states are labeled based on at least one of:
    - a state defined by a user;
    - a state determined by the user upon a query or other prompt from a computer; and
    - a state determined or detected by the computer.

20. The non-transitory computer readable storage medium of claim 18, wherein the method further comprises:
- determining a third annotated image from the input video, wherein the third annotated image identifies the object of interest at an end of the input video;
- initiating the tracker based on the third annotated image and the input video in reverse beginning from the end of the input video; and
- generating, based on the third annotated image and the input video in reverse, a second set of unlabeled images from the input video,
- wherein the first set of unlabeled images includes the second set of unlabeled images.

* * * * *